United States Patent
Chiao et al.

(10) Patent No.: US 8,550,917 B2
(45) Date of Patent: Oct. 8, 2013

(54) SYSTEM FOR DOWNLOADING REAL-TIME INTERACTION DATA THROUGH MOBILE AND BROADCAST CONVERGED NETWORKS AND METHOD THEREOF

(75) Inventors: Hsin-Ta Chiao, Nantou County (TW); Tsun-Yu Hsiao, Taichung County (TW)

(73) Assignee: Industrial Technology Research Institute, Hsinchu (TW)

( * ) Notice: Subject to any disclaimer, the term of this patent is extended or adjusted under 35 U.S.C. 154(b) by 1160 days.

(21) Appl. No.: 12/105,281

(22) Filed: Apr. 18, 2008

(65) Prior Publication Data
US 2009/0170607 A1 Jul. 2, 2009

(30) Foreign Application Priority Data
Dec. 31, 2007 (TW) ................. 96151538 A (51) Int. Cl.
A63F 13/12 (2006.01)
(52) U.S. Cl.
USPC .................. 463/40; 463/41; 463/42
(58) Field of Classification Search
USPC ................... 463/40–43
See application file for complete search history.

(56) References Cited

U.S. PATENT DOCUMENTS

| | | | | |
|---|---|---|---|---|
| 5,768,539 A * | 6/1998 | Metz et al. | ...... | 709/249 |
| 6,453,160 B1 * | 9/2002 | Thomas et al. | ...... | 455/419 |
| 7,587,736 B2 * | 9/2009 | Summers et al. | ...... | 725/95 |
| 8,151,306 B2 * | 4/2012 | Rakib | ...... | 725/71 |
| 2001/0049304 A1 * | 12/2001 | Orui | ...... | 463/42 |
| 2003/0009763 A1 * | 1/2003 | Crinon et al. | ...... | 725/92 |
| 2003/0171148 A1 * | 9/2003 | Weitz | ...... | 463/40 |
| 2006/0089935 A1 * | 4/2006 | Clifford et al. | ...... | 707/10 |
| 2006/0240851 A1 | 10/2006 | Washburn | | |
| 2007/0293229 A1 * | 12/2007 | Khan | ...... | 455/450 |
| 2008/0008167 A1 * | 1/2008 | Ver Steeg | ...... | 370/389 |

(Continued)

FOREIGN PATENT DOCUMENTS

JP 2001-286682 10/2001
JP 2002-271281 9/2002

(Continued)

OTHER PUBLICATIONS

Alex Jarett, et. al., IDGA Online Games While Paper 2nd Edition (Mar. 2003) ("IGDA").*

(Continued)

Primary Examiner — Sunit Pandya
Assistant Examiner — Bach Hoang
(74) Attorney, Agent, or Firm — Jianq Chyun IP Office (57) ABSTRACT

A system for downloading real-time interaction data and a method thereof are provided. The system includes a real-time interaction data management server farm, a network equipment, a carousel server, and at least one terminal device. The real-time interaction data management server farm processes real-time interaction data and manages a plurality of real-time data packages thereof. The network equipment provides a unidirectional broadcast network and a bidirectional mobile network as media for transmitting the real-time data packages. The carousel server receives the real-time data packages and transmits the real-time data packages in a carousel delivery method, a single-pass delivery method or a carousel and single-pass delivery method through the unidirectional broadcast network. The terminal device receives the real-time data packages through the unidirectional broadcast network or requests and receives the real-time data packages through the bidirectional mobile network. Thereby, the real-time interaction data can be quickly downloaded in a mobile environment.

24 Claims, 6 Drawing Sheets

(56) References Cited

U.S. PATENT DOCUMENTS

| | | | |
|---|---|---|---|
| 2008/0070688 A1* | 3/2008 | Loehrer | 463/42 |
| 2009/0235191 A1* | 9/2009 | Garbow et al. | 715/764 |
| 2010/0023972 A1* | 1/2010 | Summers et al. | 725/54 |
| 2010/0144380 A1* | 6/2010 | Washburn | 455/466 |

FOREIGN PATENT DOCUMENTS

| | | |
|---|---|---|
| JP | 2006-512790 | 4/2006 |
| JP | 2006-526319 | 11/2006 |
| JP | 2007-235511 | 9/2007 |
| JP | 2007-528762 | 10/2007 |
| JP | 2007-536834 | 12/2007 |

OTHER PUBLICATIONS

"Office Action of Japan Counterpart Application", issued on Mar. 15, 2011, p. 1-p. 5.

"Office Action of Taiwan Counterpart Application", issued on Sep. 21, 2011, p. 1-p. 8.

* cited by examiner

SYSTEM FOR DOWNLOADING REAL-TIME INTERACTION DATA THROUGH MOBILE AND BROADCAST CONVERGED NETWORKS AND METHOD THEREOF

CROSS-REFERENCE TO RELATED APPLICATION

This application claims the priority benefit of Taiwan application serial no. 96151538, filed on Dec. 31, 2007. The entirety of the above-mentioned patent application is hereby incorporated by reference herein and made a part of this specification.

BACKGROUND OF THE INVENTION

1. Field of the Invention

The present invention generally relates to a system for downloading real-time interaction data through mobile and broadcast converged networks and a method thereof.

2. Description of Related Art

An existing Java game download platform is a service provided by a mobile phone network provider and it allows mobile phone users to download online Java games. A mobile phone user can connect to a Java game portal at any time through the mobile phone network to download online Java games. Such technique for downloading and installing online Java game is referred as over-the-air (OTA) technique. Due to the bandwidth limitation of mobile phone networks, OTA Java games are usually small games (for example, their memory footprints are usually within 1 MB).

The demand for running mobile massively multiplayer online games (MMOGs) on handheld devices has been growing along with the advancement of the processing capability of handheld devices. Presently, to run a MMOG on a personal computer (PC), a bundle of game data whose total size is about the capacity of a DVD ROM has to be installed into the PC before the first time of running the game online. However, since aforementioned OTA function has to be provided for installing and running a MMOG on a mobile device conveniently, and the total size of game data required by a 3D mobile MMOG is usually very large, it is almost impossible to download the complete game data at once through a mobile phone network due to the bandwidth limitation thereof. Accordingly, a system and a method for quickly downloading real-time interaction data in a mobile environment are desired.

SUMMARY OF THE INVENTION

Accordingly, the present invention generally relates to a system for downloading real-time interaction data through a unidirectional broadcast network and a bidirectional mobile network.

The present invention generally relates to a method for downloading real-time interaction data through a unidirectional broadcast network and a bidirectional mobile network.

The present invention generally relates to a system for downloading mobile massively multiplayer online game (MMOG) data through a unidirectional broadcast network and a bidirectional mobile network.

The present invention generally relates to a method for downloading mobile MMOG data through a unidirectional broadcast network and a bidirectional mobile network.

The present invention provides a system for downloading mobile MMOG data. The system includes a real-time interaction data management server farm, a network equipment, a carousel server, and at least one terminal device. The real-time interaction data management server farm controls the execution of a mobile MMOG and manages a plurality of regional game data packages that contains the required game data of the mobile MMOG. The network equipment provides a unidirectional broadcast network and a bidirectional mobile network as media for transmitting the regional game data packages. The carousel server receives the regional game data packages and transmits the regional game data packages in a multimode transmission method through the unidirectional broadcast network. The terminal device receives the regional game data packages for supporting the execution of the mobile MMOG client main program on the terminal device, wherein the terminal device receives the regional game data packages through the unidirectional broadcast network and requests and receives the regional game data packages through the bidirectional mobile network.

The present invention provides a method for downloading game data of a mobile MMOG. The method includes following steps. First, the game data of the mobile MMOG is divided into a plurality of regional game data packages in unit of the regions of the virtual game world (virtual regions). Next, a request for a main program of the mobile MMOG is transmitted by connecting to a portal through a bidirectional mobile network, and the main program of the mobile MMOG is downloaded and executed through the bidirectional mobile network or a unidirectional broadcast network. In addition, in another exemplary embodiment of the present invention, the main program may be downloaded from the unidirectional broadcast network without the explicit request. After that, subsequent regional game data packages are received through the unidirectional broadcast network and are requested and received through the bidirectional mobile network, wherein the unidirectional broadcast network transmits the regional game data packages in a multimode transmission method.

The present invention provides a system for downloading real-time interaction data. The system includes a real-time interaction data management server farm, a network equipment, a carousel server, and at least one terminal device. The real-time interaction data management server farm processes the real-time interaction data and manages a plurality of real-time data packages of the real-time interaction data. The network equipment provides a unidirectional broadcast network and a bidirectional mobile network as media for transmitting the real-time interaction data. The carousel server receives the real-time data packages and transmits the real-time data packages in a multimode transmission method through the unidirectional broadcast network. The terminal device receives the real-time data packages, wherein the terminal device receives the real-time data packages through the unidirectional broadcast network and requests and receives the real-time data packages through the bidirectional mobile network.

The present invention provides a method for downloading real-time interaction data. The method includes following steps. First, the real-time interaction data is divided into a plurality of real-time data packages. Next, a main program of the real-time interaction data is downloaded and executed through a bidirectional mobile network or a unidirectional broadcast network. After that, subsequent real-time data packages are received through the unidirectional broadcast network and are requested and received through the bidirectional mobile network, wherein the unidirectional broadcast network transmits the real-time data packages in a multimode transmission method.

In the present invention, real-time data packages of real-time interaction data are transmitted through a unidirectional broadcast network and a bidirectional mobile network. Thereby, the real-time interaction data can be quickly downloaded in a mobile environment.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

Reference will now be made in detail to the present exemplary embodiments of the invention, examples of which are illustrated in the accompanying drawings. Wherever possible, the same reference numbers are used in the drawings and the description to refer to the same or like parts.

The present invention provides a system for downloading real-time interaction data through mobile and broadcast converged networks and a method thereof. According to the present invention, a user can quickly download and use real-time interaction data in a mobile environment. Here, the real-time interaction data refers to the data in large volume of a mobile application, and the data are required to be downloaded by a mobile device for the interactions between the mobile device and the remote server (for example, the game data of a massively multiplayer online game [MMOG]). The exemplary embodiments of the present invention will be described below with reference to accompanying drawings.

It should be understood that the connections and data transmissions between servers and/or elements mentioned in the present disclosure are not limited to physically wired connections and data transmissions only; instead, the connections and data transmissions may also be presented in a wireless pattern.

Figure 1:
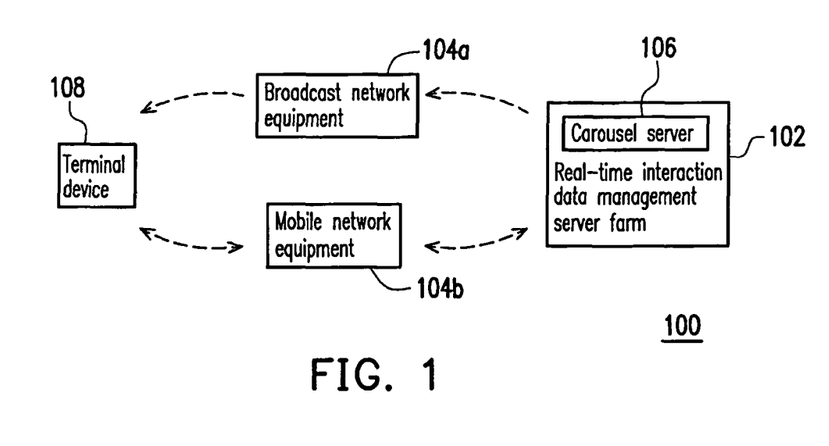
FIG. 1 is a block diagram of a real-time interaction data (i.e. mobile massively multiplayer online game [MMOG] data) download system according to an exemplary embodiment of the present invention.

FIG. 1 is a block diagram of a real-time interaction data download system 100 according to an exemplary embodiment of the present invention. Since the present exemplary embodiment is applied to a mobile MMOG, the real-time interaction data download system 100 may also be referred as a mobile MMOG download system 100.

Referring to FIG. 1, the mobile MMOG download system 100 includes a real-time interaction data management server farm (also referred as a mobile MMOG server farm in the present exemplary embodiment) 102, a broadcast network equipment 104a, a mobile network equipment 104b, a carousel server 106, and at least one terminal device 108.

The mobile MMOG server farm 102 controls the execution of the mobile MMOG and manages a plurality of regional game data packages (i.e. real-time data packages) of game data of the mobile MMOG. The regional game data packages are independent data packages obtained by respectively encapsulating game data in different areas of the virtual game world. For example, a regional game data package of a 3D mobile MMOG includes map data, object model data, and texture data. Additionally, the regional game data package may also includes video/audio data and computer programs used in particular virtual regions.

In the present exemplary embodiment, the mobile MMOG server farm 102 includes a plurality of online game management servers which are respectively used for processing and managing the game data and transmitting the regional game data packages. For example, the mobile MMOG server farm 102 includes a game logic control server farm 102a, a game management server 102b, a user database 102c, a game logic database 102d, a game data package database 102e, and a game data package download server 102f (as shown in FIG. 2).

Figure 2:
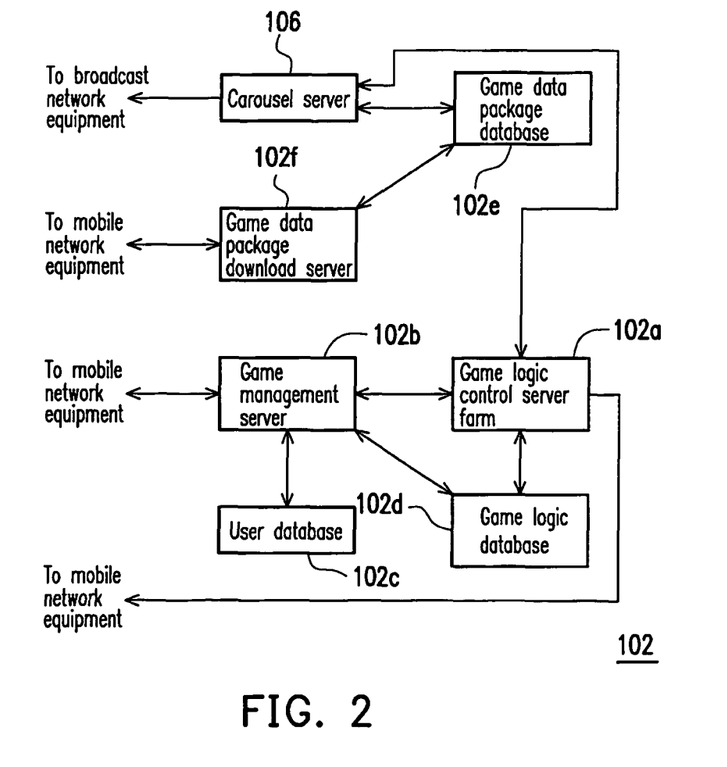
FIG. 2 is a detailed block diagram of a mobile MMOG server farm in FIG. 1.

Referring to FIG. 2, the game logic control server farm 102a controls and manages the operation of game logic in each region of the virtual world of the mobile MMOG. To be specific, the game logic control server farm 102a is composed of one or multiple game logic control servers (not shown), wherein each game logic control server controls and manages the operation of game logic in one or several regions of the game's virtual world.

The game management server 102b is connected to the game logic control server farm 102a for managing the login and logout of game players (users) of the mobile MMOG.

The user database 102c is connected to the game management server 102b for storing information of game players, wherein the information contains subscription and payment information, access right information, and game state information of the game players.

The game logic database 102d is connected to the game logic control server farm 102a and the game management server 102b for recording the mappings between virtual regions in the game and aforementioned game logic control servers. To be specific, because the game logic control servers of the game logic control server farm 102a are respectively used for controlling and managing the operation of game logic in different regions of the game's virtual world, the game logic database 102d is used for recording the mappings between the game logic control servers and the virtual regions.

As described above, the game logic control server farm 102a, the game management server 102b, the user database 102c, and the game logic database 102d are used for processing and managing the game data. For example, when a game player connects and logins into the game management server 102b through a terminal device 108, the game logic database 102d directs the game player to an appointed game logic control server in the game logic control server farm 102a according to the user information stored in the user database 102c so as to allow the game player to play the game. When the game player gets close to the boundary of a region controlled by the current game logic control server in the game's virtual world, the current game logic control server transmits the position information of the game player in the virtual world to the game logic database 102d. The game logic database 102d then finds the next game logic control server that is responsible for controlling the region adjacent to the current region of the game player from the game logic control server farm 102a and sends the node access information of the next game logic control server to the current game logic control server. Once the game player leaves the virtual region controlled by the current game logic control server, the current game logic control server forwards the latest subscription and payment information, access right information, and game state information of the game player to the next game logic control server, and besides, the current game logic control server also transmits the node access information of the next game logic control server to the terminal device 108 of the game player so that the terminal device 108 can connect to the next game logic control server to play the game continuously.

Additionally, in order to prevent lost or incorrect game data caused by server shutdown in the mobile MMOG server farm 102, terminal device 108 shutdown, or network connection failure, the game logic control servers in the game logic control server farm 102a can instantly or periodically transmit and record the complete game information of the game player or the updated portion thereof into the user database 102c. When any of the foregoing problems occur, the recorded game information of the game player before the problem occurs will be resumed when the game player logins into the server again.

Referring to FIG. 2 again, the game data package database 102e is connected to the carousel server 106 for storing the regional game data packages.

The game data package download server 102f is connected to the game data package database 102e for receiving download requests from the terminal device 108. Thus, the game data package database 102e and the game data package download server 102f are used for storing and transmitting the regional game data packages. For example, when the game data package download server 102f receives a message from the terminal device 108 for requesting a particular game data package, the game data package download server 102f determines whether to transmit the game data package requested by the terminal device 108 through the mobile network according to the current load of the game data package download server 102f, the type of the request message (for example, whether it is an emergent request), the bandwidth limitation of the mobile network for transmitting game data package, and whether the requested game data package will soon be delivered on the broadcast network, etc. If the game data package download server 102f determines to transmit the game data package, it first checks whether it has the game data package (for example, whether the game data package has been stored in the cache of the game data package download server 102f). If the game data package download server 102f does not have the game data package, it obtains the game data package from the game data package database 102e.

Referring to FIG. 1 again, the broadcast network equipment 104a provides a unidirectional broadcast network, and the mobile network equipment 104b provides a bidirectional mobile network, wherein the networks are served as media for transmitting game data packages. To be specific, the broadcast network equipment 104a contains a set of head-end equipments for the unidirectional broadcast network and a set of transmission stations for broadcasting wireless signals. The mobile network equipment 104b contains a set of core network elements for exchanging data packets and a set of wireless network elements for receiving/sending wireless signals in the bidirectional mobile network.

Internet Protocol (IP) is used in both the unidirectional broadcast network and the bidirectional mobile network. The unidirectional broadcast network is a mobile TV broadcasting network that is compliant to either the DVB-H or DVB-SH standards, and the bidirectional mobile network is a mobile phone network that is compliant to either the 3GPP UMTS or ETSI GSM/GPRS standards. However, the present invention is not limited thereto, and any suitable combinations of mobile TV broadcasting network standards and mobile phone or mobile network standards can be applied to the present invention. The followings are some examples of the foregoing suitable combinations: First, the combination of T-DMB mobile TV network and CDMA 2000 mobile phone network. Second, the combination of FLO mobile TV network and CDMA 2000 mobile phone network. Third, applying 3GPP MBMS standard in 3GPP UMTS mobile phone network. Fourth, applying 3GPP2 BCMCS standard in CDMA2000 mobile phone network. Fifth, applying WiMAX MBS/MCBCS standard in WiMAX mobile network. In addition, communication protocols other than IP or IP-based protocols may also be used in the present invention for replace the counterparts in the foregoing IP-based exemplary embodiment.

In the present exemplary embodiment, the broadcast network equipment 104a is a set of broadcast network equipments that are compliant to either the DVB-H/DVB-IPDC standards or the DVB-H/DVB-IPDC/OMA BCAST standards. For example, the broadcast network equipment 104a includes an encapsulator 302, a modulator 304, an up converter 306, and a transmitter 308. Since the broadcast network equipment 104a is compliant to the DVB-H standard, the foregoing elements may also be referred as DVB-H IP encapsulator 302, DVB-H modulator 304, DVB-H up converter 306, and DVB-H transmitter 308 (as shown in FIG. 3).

Figure 3:
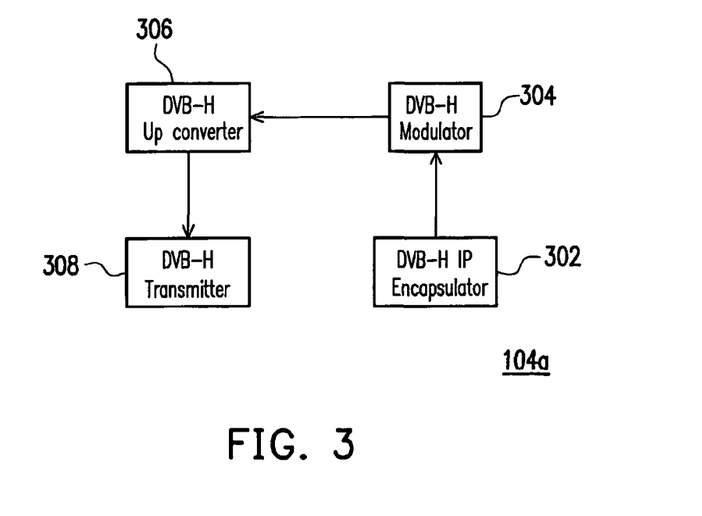
FIG. 3 is a detailed block diagram of a broadcast network equipment in FIG. 1.

Referring to FIG. 3, the DVB-H IP encapsulator 302 encapsulates the data packets for delivering regional game data packages into one or multiple transmission streams. The DVB-H modulator 304 is connected to the DVB-H IP encapsulator 302 for modulating the transmission streams. The DVB-H up converter 306 is connected to the DVB-H modulator 304 for converting each signal of the modulated transmission streams to a specific frequency thereof. The DVB-H transmitter 308 is connected to the DVB-H up converter 306 for transmitting the converted signals of the transmission streams.

To be specific, the mobile MMOG server farm 102 transmits IP packets (containing the game data package) to the terminal device 108 through the broadcast network equipment 104a. The DVB-H IP encapsulator 302 receives the IP packet stream from the mobile MMOG server farm 102 and loads the IP packet stream into a MPEG-2 transmission stream according to the specifications of the DVB-H/DVB-IPDC standards, and then the DVB-H IP encapsulator 302 outputs the MPEG-2 transmission stream to the DVB-H modulator 304. The DVB-H modulator 304 modulates the MPEG-2 transmission stream according to the specifications of the DVB-H/DVB-T standards and outputs the modulated signal to the DVB-H up converter 306. The DVB-H up converter 306 moves the frequency center of the input signal to an appointed frequency and outputs the converted signal to the DVB-H transmitter 308. The DVB-H transmitter 308 amplifies the power of the input signal and then emits the signal with a predetermined power through the antenna (not shown) thereof in a wireless pattern.

Figure 4:
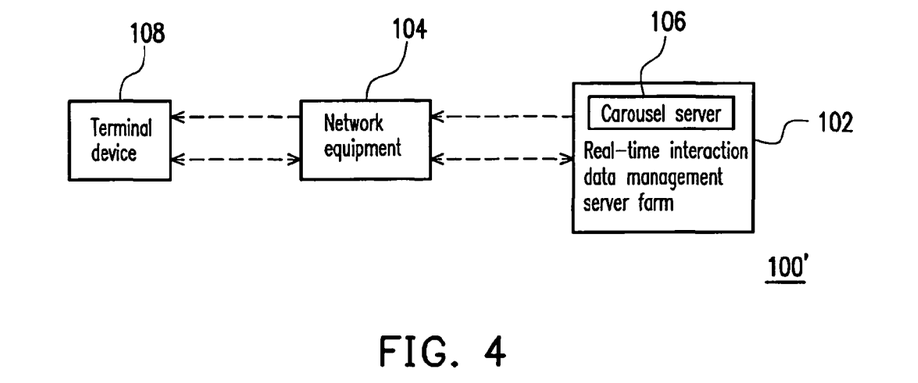
FIG. 4 is a block diagram of a real-time interaction data (i.e. a mobile MMOG data) download system according to another exemplary embodiment of the present invention.

In the present exemplary embodiment, different communication networks (i.e. the unidirectional broadcast network and the bidirectional mobile network) are respectively provided by the broadcast network equipment 104a and the mobile network equipment 104b. However, in another exemplary embodiment of the present invention, the unidirectional broadcast network and the bidirectional mobile network may also be provided by a single network equipment 104 (for example, the mobile MMOG download system 100' as shown in FIG. 4). This exemplary embodiment can be applied in the following situations: First, applying 3 GPP MBMS standard in 3GPP UMTS mobile phone network. Second, applying 3GPP2 BCMCS standard in CDMA2000 mobile phone network. Third, applying WiMAX MBS/MCBCS standard in WiMAX mobile network.

The carousel server 106 receives the regional game data packages from the mobile MMOG server farm 102 and broadcasts these regional game data packages through the unidirectional broadcast network in a multimode transmission method, wherein the multimode transmission method includes a carousel delivery method, a single-pass delivery method, or a carousel and single-pass delivery method. Here, the carousel delivery method is to group one or multiple regional game data packages into a collection, divide the data packages in the collection into small blocks, and then transmit these blocks either sequentially or in different repetition time for different blocks. In the present exemplary embodiment, the carousel server 106 is disposed in the mobile MMOG server farm 102. However, in another exemplary embodiment of the present invention, the carousel server 106 may also be disposed in the network equipment 104.

The terminal device 108 receives the regional game data packages for running the foregoing mobile MMOG. In the present embodiment, the terminal device 108 is a mobile phone. However, the present invention is not limited thereto, and in another exemplary embodiment of the present invention, the terminal device 108 may also be a personal digital assistant (PDA), a mobile computer, a PC notebook, or other suitable handheld device.

To be specific, the terminal device 108 can receive the game data packages through the unidirectional broadcast network and the bidirectional mobile network. In the case that the terminal device 108 receives the data packages through the unidirectional broadcast network, the terminal device 108 receives the wireless signal emitted by the DVB-H transmitter 408 and performs a series of operations (for example, down conversion, demultiplex, and IP decapsulation etc) to the wireless signal so as to obtain the game data packages transmitted by the mobile MMOG server farm 102. In addition, in the case that the terminal device 108 receives the data packages through the bidirectional mobile network, the mobile MMOG server farm 102 and the terminal device 108 communicates with each other through the mobile network equipment 104b based on the Internet protocol.

It should be mentioned that in another exemplary embodiment of the present invention, the game data packages are encoded by using forward error correction (FEC) code (for example, a fountain code such as Raptor code or Luby Transform [LT] code) on the application layer before they are transmitted. Besides, the FEC encoding may also be performed only to particular objects or particular data blocks in the game data packages.

Figure 5:
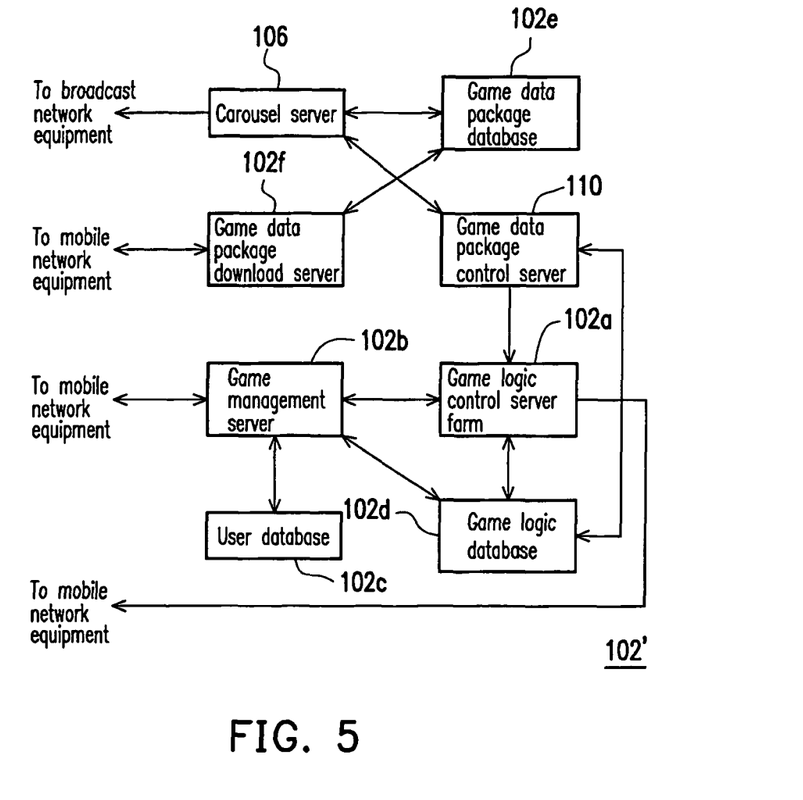
FIG. 5 is a detailed block diagram of a mobile MMOG server farm according to another exemplary embodiment of the present invention.

In another exemplary embodiment of the present invention, the mobile MMOG download system 100 further includes a real-time data package control server (also referred as a game data package control server in the present exemplary embodiment) 110 disposed in a mobile MMOG server farm 102' (as shown in FIG. 5). The game data package control server 110 is connected to the carousel server 106 for calculating a scheduling information of the regional game data packages, wherein the carousel server 106 broadcasts the regional game data packages according to the scheduling information. To be specific, the game data package control server 110 determines which regional game data packages are to be transmitted through the unidirectional broadcast network according to the information from the game logic control server farm 102a and the game data package download server 102f. Moreover, the game data package control server 110 calculates the scheduling information of the game data packages to be transmitted on the unidirectional broadcast network, wherein the transmission bandwidth, the time to start the transmission, the transmission method (for example, a carousel delivery method, a single-pass delivery method, and a carousel and single-pass delivery method) of the game data packages are specified in the scheduling information. In addition, the scheduling information is transmitted to the carousel server 106 and the game data package download server 102f.

For example, the scheduling information is determined according to at least one of the distribution of a plurality of game players in a plurality of virtual regions in the game's virtual world, the transmission requests sent by the game players through the bidirectional mobile network, the bandwidth limitations of the unidirectional broadcast network and the bidirectional mobile network, and the load limitation for the mobile MMOG server farm 102 to transmit the regional game data packages through the bidirectional mobile network. The game data package control server 110 usually re-calculates the scheduling information for transmitting game data packages through the unidirectional broadcast network at particular intervals (for example, every hour). The interval for re-calculating the scheduling information is related to the size of a virtual region that is covered by a game data package in the virtual world of the mobile MMOG. If a game data package can cover a larger region, the interval for re-calculating the scheduling information can be set longer. Besides, the game data package control server 110 may be triggered to re-calculate the scheduling information when a special event takes place, for example, too many game players' login or logout the MMOG during a short period, or the bandwidth limitations of the broadcast network and the mobile network for the mobile MMOG are changed.

From the point of view of the terminal device 108, after a game player logins into the game, the game management server 102b transmits the node access information of the carousel server 106, the node access information of the game data package download server 102f, and the scheduling information of game data packages to be transmitted through the broadcast network to the main program of the mobile MMOG in the terminal device 108. While playing the game, the main program in the terminal device 108 automatically predicts and loads game data packages of adjacent regions. The main program of the mobile MMOG loads the desired game data packages respectively through the unidirectional broadcast network or the bidirectional mobile network according to the node access information of the carousel server 106 and the node access information of the game data package download server 102f. In addition, the main program of the mobile MMOG can determine whether to load the desired game data packages from the unidirectional broadcast network or the bidirectional mobile network according to the scheduling information of the game data packages transmitted through the unidirectional broadcast network.

It should be mentioned here that in the present exemplary embodiment, the unidirectional broadcast network is a unidirectional broadcast network without regional broadcast, such as a single frequency network (SFN), which means that all the cells in the broadcast network operate in the same frequency. Thus, no handover is required when the terminal device 108 is moved from one cell to another cell. However, in another exemplary embodiment of the present invention, the unidirectional broadcast network may also be a unidirectional broadcast network with regional broadcast, such as a multi-frequency network (MFN), which means that adjacent cells in the broadcast network operate in different frequencies. Thus, a handover is required when the terminal device 108 is moved from one cell to another cell.

Figure 6A:
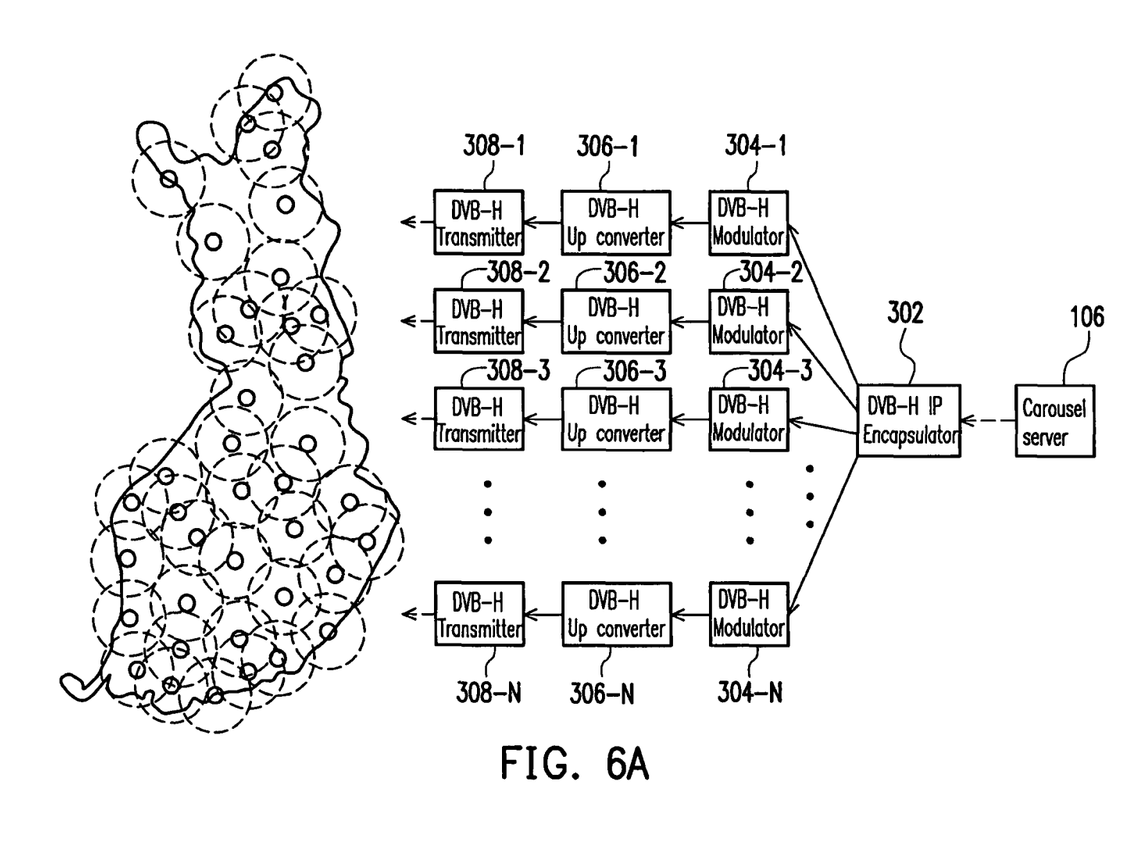
FIG. 6A and FIG. 6B are comparative diagrams of broadcast equipments of unidirectional broadcast networks with and without regional broadcast.
Figure 6B:
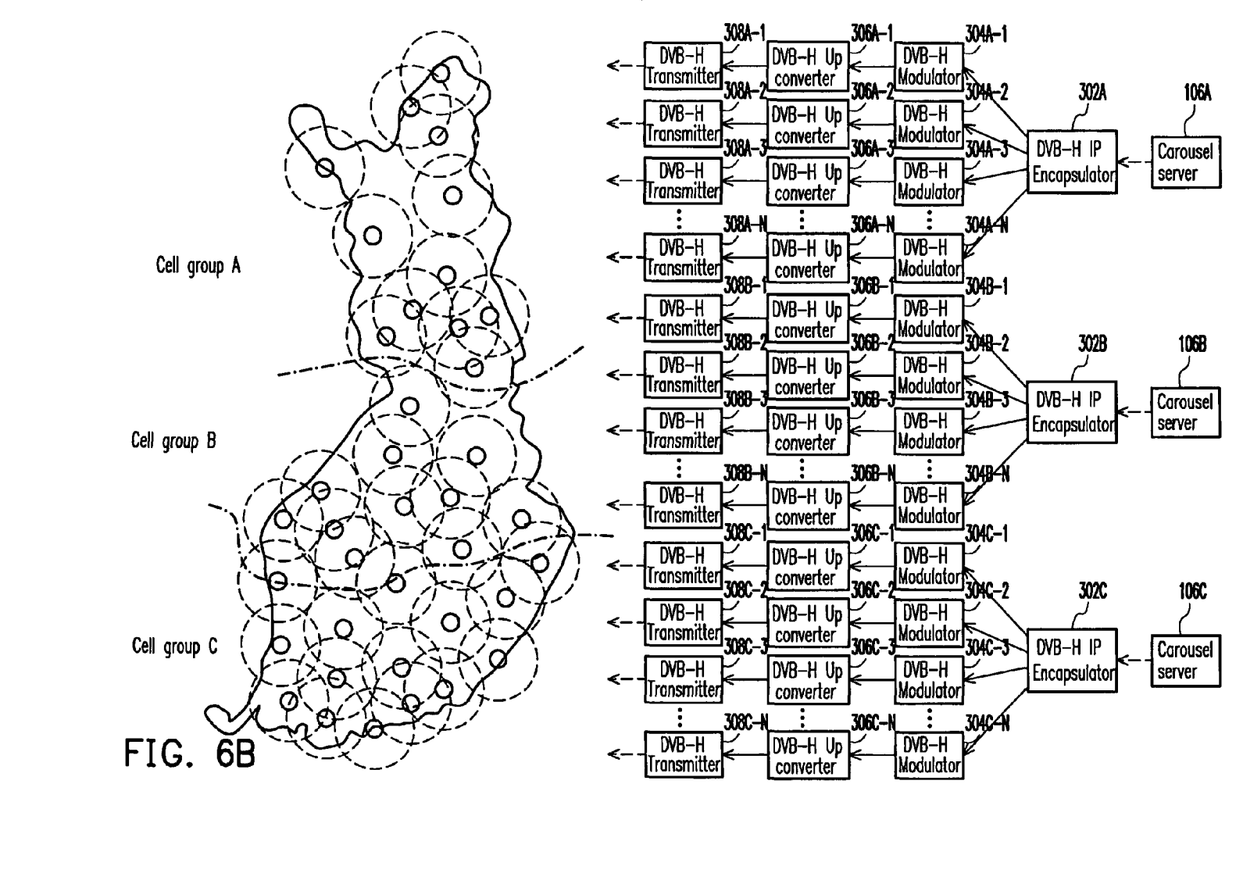

FIG. 6A and FIG. 6B are comparative diagrams of broadcast equipments of unidirectional broadcast networks with and without regional broadcast.

If the unidirectional broadcast network is a SFN, the mobile MMOG download system 100 broadcasts with elements as shown in FIG. 6A. Since the unidirectional broadcast network is a SFN, game data is broadcasted to the entire region according to the same scheduling information. Referring to FIG. 6A, N broadcast network cells are respectively disposed with DVB-H modulators 304-1~304-N, DVB-H up converters 306-1~306-N, and DVB-H transmitters 308-1~308-N. However, one mobile MMOG download system 100 needs only one carousel server 106 and one DVB-H IP encapsulator 302.

If the unidirectional broadcast network is a MFN, the cells in the unidirectional broadcast network are grouped into a plurality of cell groups, and a carousel server and a DVB-H IP encapsulator in the broadcast network equipment are disposed corresponding to each cell group. Besides, each broadcast network cell is still disposed exclusively with a DVB-H modulator, a DVB-H up converter, and a DVB-H transmitter. Referring to FIG. 6B, the broadcast network cells are grouped into a cell group A, a cell group B, and a cell group C, wherein each cell group includes N broadcast network cells. In the mobile MMOG download system, the carousel server 106A and the DVB-H IP encapsulator 302A serve the cell group A, the carousel server 106B and the DVB-H IP encapsulator 302B serve the cell group B, the carousel server 106C and the DVB-H IP encapsulator 302C serve the cell group C, and each broadcast network cell is disposed exclusively with a DVB-H modulator, a DVB-H up converter, and a DVB-H transmitter (similar to FIG. 6A), the other elements (as shown in FIG. 1) of the mobile MMOG download system are shared by the broadcast network cells. Thus, the game data package control server 110 respectively calculate different scheduling information for different cell groups and broadcasts by using corresponding broadcast elements. The characteristics of game players and the network transmission situations in different physical areas can be appropriately considered by broadcasting different game data packages for different cell groups according to different schedules, so that the carousel of game data packages can be made suitable to game players in different physical areas.

As described above, in the present exemplary embodiment, the mobile MMOG download system can download game data packages in a mobile TV system conforming to either the DVB-H/DVB-IPDC standards or the DVB-H/DVB-IPDC/OMA BCAST standards, and a mobile phone system conforming to either the 3 GPP UMTS standard or the ETSI GSM/GPRS standards, through a unidirectional IP broadcast network and a bidirectional IP mobile network.

Figure 7:
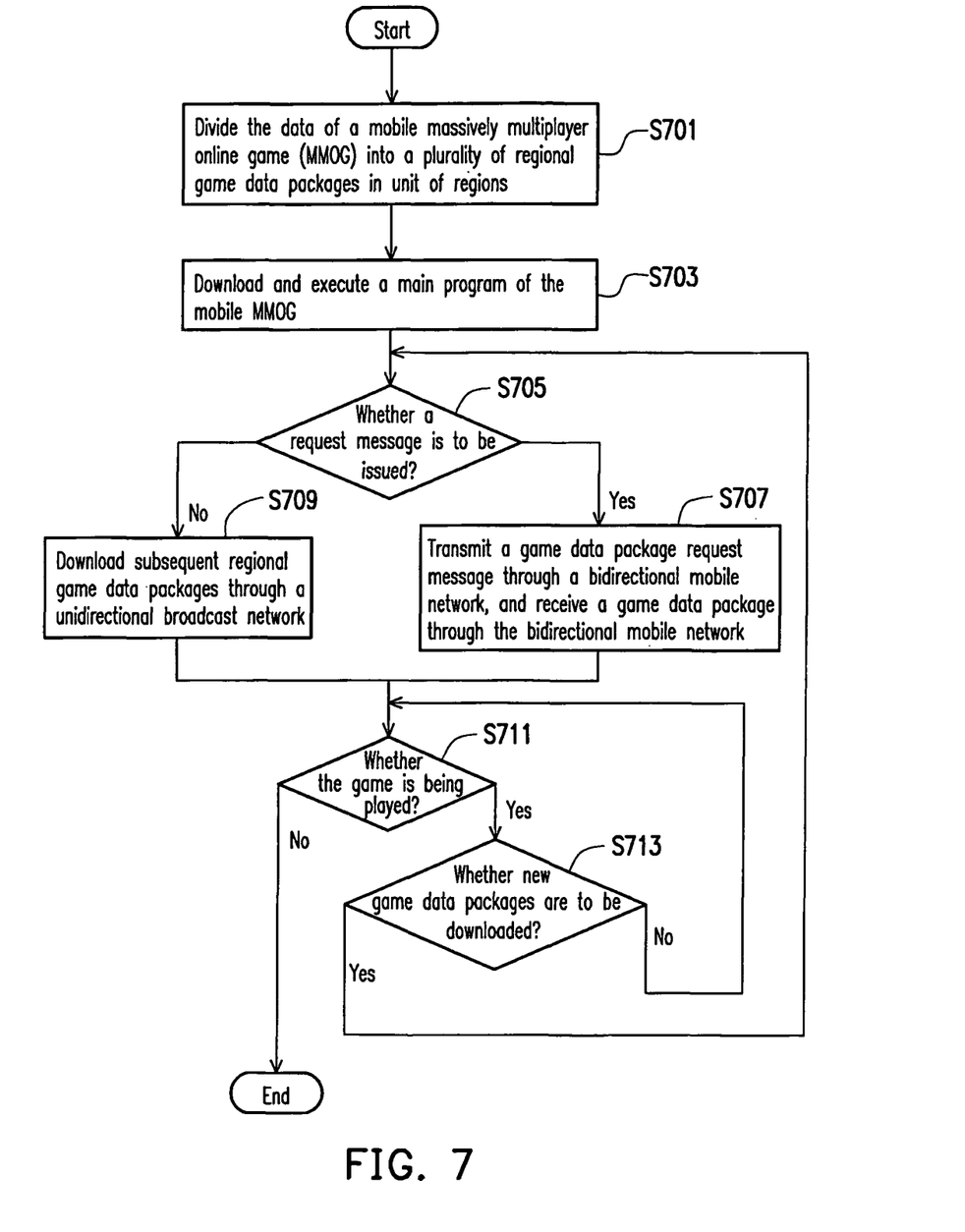
FIG. 7 is a flowchart of a method for downloading real-time interaction data (i.e. regional game data packages) according to an exemplary embodiment of the present invention.

FIG. 7 is a flowchart of a method for downloading real-time interaction data (i.e. regional game data packages) according to an exemplary embodiment of the present invention. As described above, a mobile MMOG is taken as an example in the present exemplary embodiment, and accordingly, the method for downloading the game data of the mobile MMOG will be described below.

Referring to FIG. 7, in step S701, the game data of the mobile MMOG is divided into a plurality of regional game data packages. To be specific, in the present exemplary embodiment, the game data of the mobile MMOG is divided into a plurality of regional game data packages in unit of regions on the map of the virtual game world of the mobile MMOG, wherein the game data includes map data, object model data, and texture data etc.

In step 703, a terminal device 108 of a game player connects to a portal (for example, the webpage of a game provider) through a bidirectional mobile network and downloads and executes a main program of the mobile MMOG through the bidirectional mobile network. To be specific, once the game player runs the main program, the terminal device 108 is connected to a mobile MMOG server farm 102 through the bidirectional mobile network, and an online game management server in the mobile MMOG server farm 102 performs related authentication, management, and execution operations of the online game.

In another exemplary embodiment of the present invention, the terminal device 108 of the game player may download and execute the main program of the mobile MMOG through a unidirectional broadcast network.

Thereafter, in step S705, main program executed by the terminal device 108 determines whether to issue a request message for requesting desired game data packages. If it is determined in step S705 that a request message is to be issued, in step S707, the main program executed by the terminal device 108 transmits a game data package request message and receives the desired game data packages through the bidirectional mobile network. If it is determined in step S705 that the terminal device 108 will wait for the broadcast carousel instead of issuing a request message, then in step S709, the terminal device 108 waits for the carousel through the unidirectional broadcast network in order to download subsequent regional game data packages. How to determine whether to receive the game data packages through the unidirectional broadcast network or the bidirectional mobile network has been explained above therefore will not be described herein. Next, in step S711, the system determines whether the game player is still playing the game. If the game player is playing the game, whether new game data packages are to be downloaded is determined in step S713. If it is determined that new game data packages are to be downloaded in step S713, step S705 is executed to determine whether a request message is to be issued through the bidirectional mobile network; otherwise, step S711 is executed to determine whether the user is still playing the game.

In another exemplary embodiment of the present invention, regional game data packages are transmitted through the unidirectional broadcast network according to aforementioned scheduling information in a carousel delivery method, a single-pass delivery method, or a carousel and single-pass delivery method.

In yet another exemplary embodiment of the present invention, the method for downloading the regional game data packages further includes transmitting the regional game data packages regarding different physical areas according to different scheduling information. In other words, if the unidirectional broadcast network is a MFN, cells in the unidirectional broadcast network can be grouped into a plurality of cell groups, and different game data packages are broadcasted for different cell groups according to different schedules. Accordingly, the characteristics of game players and the network transmission situations of each physical area can be appropriately considered, so that the broadcast of game data packages can be made suitable or specific to the requirement of game players in each physical area.

In overview, in the system and method for downloading real-time interaction data provided by the present invention, the real-time interaction data (for example, game data) is divided into a plurality of data packages according to the characteristic thereof, and a game player can download subsequent data packages through a bidirectional mobile network, and through a unidirectional broadcast network in a carousel delivery method, a single-pass delivery method, or a carousel and single-pass delivery method, so that the game player can execute an interactive application/program on a mobile terminal device. For example, a game player can start to play a mobile MMOG having large quantity of game data by initially downloading only the main program. Moreover, regarding a 3D mobile MMOG having a large quantity of game data, the present invention can reduce the required bandwidth for a terminal device to downloading game data packages through a mobile network. According to the present invention, downloading and installing a mobile MMOG through the OTA technique is made practical. Furthermore, by providing the mobile MMOG service through the combination of mobile and broadcast networks, the bandwidth usage of the both networks can be optimized.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A mobile massively multiplayer online game (MMOG) data download system, comprising:
    a real-time interaction data management server farm, for executing a mobile MMOG and managing game data of the mobile MMOG, wherein the game data of the mobile MMOG is divided into a plurality of regional game data packages belonging to virtual regions planned on a map of a virtual game world of the mobile MMOG in units of the virtual regions;
    a network equipment, for providing a unidirectional broadcast network and a bidirectional mobile network as media for transmitting the regional game data packages;
    a carousel server, for receiving the regional game data packages and transmitting the regional game data packages through the unidirectional broadcast network in a multimode transmission method;
    a real-time data package control server connected to the carousel server for calculating a scheduling information of the regional game data packages, wherein the carousel server transmits the regional game data packages according to the scheduling information and the scheduling information is determined according to a distribution of a plurality of game players in the virtual regions and transmission requests for the regional game data packages sent by a plurality of game players through the bidirectional mobile network; and
    at least one terminal device, for receiving the regional game data packages so as to execute the mobile MMOG, wherein the terminal device receives the regional game data packages through the unidirectional broadcast network and requests and receives the regional game data packages through the bidirectional mobile network, wherein the real-time interaction data management server farm controls and manages the operation of game logic in the virtual regions in the virtual game world of the mobile MMOG.

2. The mobile MMOG data download system according to claim 1, wherein the multimode transmission method comprises a carousel delivery method, a single-pass delivery method, or a carousel and single-pass delivery method.

3. The mobile MMOG data download system according to claim 1, wherein the network equipment comprises:
    a broadcast network equipment, for providing the unidirectional broadcast network; and
    a mobile network equipment, for providing the bidirectional mobile network.

4. The mobile MMOG data download system according to claim 1, wherein the carousel server is disposed in the real-time interaction data management server farm.

5. The mobile MMOG data download system according to claim 3, wherein the carousel server is disposed in the broadcast network equipment.

6. The mobile MMOG data download system according to claim 1, wherein the unidirectional broadcast network is a unidirectional broadcast network with regional broadcast capability.

7. The mobile MMOG data download system according to claim 1, wherein the real-time interaction data management server farm further comprises:
    a game logic control server farm, comprising a plurality of game logic control servers for respectively controlling and managing the operation of game logic in the virtual regions in the virtual game world of the mobile MMOG;
    a game management server, connected to the game logic control server farm for managing the logins and logouts of a plurality of game players;
    a user database, connected to the game management server for storing information of the game players;
    a game logic database, connected to the game logic control server farm and the game management server for recording mappings between the virtual regions and the game logic control servers;
    a game data package database, connected to the carousel server for storing the regional game data packages; and
    a game data package download server, connected to the game data package database for receiving and responding to a download request of the terminal device.

8. The mobile MMOG data download system according to claim 3, wherein the broadcast network equipment comprises:
    an encapsulator, for encapsulating the data packets for delivering the regional game data packages into at least one transmission stream;
    a modulator, connected to the encapsulator for modulating the at least one transmission stream;
    an up converter, connected to the modulator for respectively converting the modulated at least one transmission stream to specific frequencies of the at least one transmission stream; and
    a transmitter, connected to the up converter for transmitting the at least one transmission stream.

9. The mobile MMOG data download system according to claim 1, wherein the scheduling information is determined further according to at least one of a bandwidth limitation of the unidirectional broadcast network and the bidirectional mobile network, and a load limitation for the real-time interaction data management server farm to transmit the regional game data packages through the bidirectional mobile network.

10. The mobile MMOG data download system according to claim 9, wherein the real-time data package control server determines an interval for re-calculating the scheduling information according to the size of the virtual regions in the virtual world of the mobile MMOG.

11. The mobile MMOG data download system according to claim 1, wherein the regional game data packages are encoded with a forward error correction (FEC) code.

12. The mobile MMOG data download system according to claim 11, wherein the FEC code is a fountain code.

13. The mobile MMOG data download system according to claim 12, wherein the fountain code is a Raptor code.

14. The mobile MMOG data download system according to claim 1, wherein the unidirectional broadcast network and the bidirectional mobile network communicate with an Internet protocol.

15. A mobile MMOG data download method, comprising:
dividing a game data of a mobile MMOG into a plurality of regional game data packages belonging to virtual regions planned on a map of a virtual game world of the mobile MMOG in units of the virtual regions by a mobile MMOG server farm;
connecting to a portal through a bidirectional mobile network by a terminal device;
downloading and executing a main program of the mobile MMOG through the bidirectional mobile network or a unidirectional broadcast network by the terminal device;
controlling and managing the operation of game logic in the virtual regions in the virtual game world of the mobile MMOG by a real-time interaction data management server farm;
receiving the subsequent regional game data packages through the unidirectional broadcast network by the terminal device; and
requesting and receiving the subsequent regional game data packages through the bidirectional mobile network by the terminal device,
wherein the unidirectional broadcast network transmits the regional game data packages in a multimode transmission method,
wherein the multimode transmission method is to transmit the regional game data packages according to a scheduling information and the scheduling information is determined according to a distribution of a plurality of game players in the virtual regions and transmission requests for the regional game data packages sent by a plurality of game players through the bidirectional mobile network.

16. The mobile MMOG data download method according to claim 15, wherein the multimode transmission method comprises a carousel delivery method, a single-pass delivery method, or a carousel and single-pass delivery method.

17. The mobile MMOG data download method according to claim 16, wherein the multimode transmission method is to transmit the regional game data packages according to a scheduling information,
wherein the scheduling information is determined according to at least one of a bandwidth limitation of the unidirectional broadcast network and the bidirectional mobile network, and a load limitation for a real-time interaction data management server farm to transmit the regional game data packages through the bidirectional mobile network.

18. The mobile MMOG data download method according to claim 17, further comprising determining an interval for re-calculating the scheduling information according to the size of the virtual regions in the virtual world of the mobile MMOG.

19. The mobile MMOG data download method according to claim 15, further comprising transmitting the regional game data packages regarding a plurality of physical areas according to different scheduling information.

20. The mobile MMOG data download method according to claim 15, further comprising encoding the regional game data packages with a FEC code.

21. The mobile MMOG data download method according to claim 20, wherein the FEC code is a fountain code.

22. The mobile MMOG data download method according to claim 21, wherein the fountain code is a Raptor code.

23. The mobile MMOG data download method according to claim 15, further comprising downloading the regional game data packages from the unidirectional broadcast network and the bidirectional mobile network via Internet Protocol (IP).

24. The mobile MMOG data download system according to claim 1, wherein the unidirectional broadcast network is a unidirectional broadcast network without regional broadcast capability.

* * * * *